Figure 1:
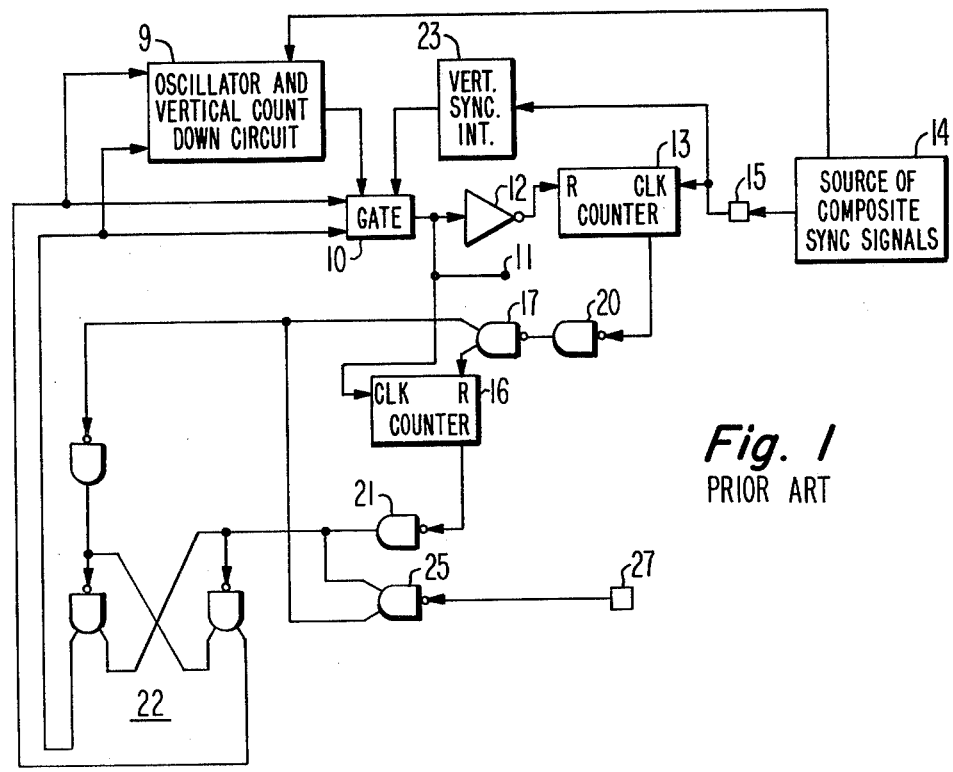

United States Patent [19]

Dietz

[11] 4,387,397
[45] Jun. 7, 1983

[54] INTEGRATED CIRCUIT INTERFACE IN A VERTICAL SYNC CIRCUIT

[75] Inventor: Wolfgang F. W. Dietz, New Hope, Pa.

[73] Assignee: RCA Corporation, New York, N.Y.

[21] Appl. No.: 246,891

[22] Filed: Mar. 17, 1981

[51] Int. Cl.³ .............................................. H04N 5/10
[52] U.S. Cl. ................................................... 358/154
[58] Field of Search ............... 358/148, 149, 153, 154, 358/150

[56] References Cited

U.S. PATENT DOCUMENTS

| | | |
|---|---|---|
| 3,688,037 | 8/1972 | Ipri . |
| 3,691,297 | 9/1972 | Merrell et al. . |
| 3,715,499 | 2/1973 | Steckler . |
| 3,751,588 | 8/1973 | Eckenbrecht et al. . |
| 3,899,635 | 8/1975 | Steckler et al. . |
| 4,238,769 | 12/1980 | Rzeszewski et al. ............... 358/154 |

Primary Examiner—Robert L. Richardson
Attorney, Agent, or Firm—E. M. Whitacre; P. J. Rasmussen; S. J. Stevens

[57] ABSTRACT

An integrated circuit interface means for use in a television receiver comprises means including an interface terminal which gives an indication of whether the receiver is operating in a standard or nonstandard mode. Standard operating mode occurs during the reception of standard broadcast signals. Non-standard non-broadcast signals cause the receiver to operate in a non-standard mode. The interface means also comprises means coupled to the same interface terminal for providing a signal to the integrated circuit which manually selects the operating mode, thereby allowing the interface terminal to serve the dual function of indicating and selecting the receiver operating mode.

3 Claims, 3 Drawing Figures

INTEGRATED CIRCUIT INTERFACE IN A VERTICAL SYNC CIRCUIT

This invention relates to integrated circuits and, in particular, to the adaptation of integrated circuit interface terminals for multiple functions.

Integrated circuit design requires careful planning in determining the manner in which the integrated circuit will interface with external circuits. The number of available interface ports or terminals is limited by the size and choice of package design and often the functions provided by the IC must be compromised somewhat by the lack of an available interface terminal.

In television receivers, for example, an integrated circuit may provide vertical synchronizing signals derived from a multiple of the horizontal line rate. These so-called countdown circuits normally provide excellent stability and eliminate the need for a vertical hold circuit and control. There are times, however, when the standard mode internally generated vertical sync signal is not desired to synchronize the receiver. This condition may occur when viewing a program from a non-broadcast source, such as a video tape recorder or camera. In those situations in which the receiver determines that the incoming signal is not a standard off-the-air signal, it is desired that the receiver will switch to a non-standard mode in which the receiver is synchronized directly by the external vertical sync signal.

During receiver testing and servicing procedures, it is desirable to be able to determine if the synchronizing circuit is operating in the standard or non-standard mode at a given time. It is also desirable to be able to cause the circuit to operate in a particular mode by an appropriate control signal.

The present invention provides an integrated circuit incorporating a vertical countdown synchronizing system. The integrated circuit comprises interface means utilizing a single multiple function interface terminal which indicates the circuit mode of operation and also permits the selection of a particular mode through the injection of an appropriate signal.

In accordance with the present invention, an interface means is incorporated in an integrated circuit for use in a television receiver. The receiver incorporates oscillator means, countdown means coupled to the oscillator means for providing a first vertical deflection rate signal, a source of second vertical deflection rate signals and gating means selectively responsive to the first and second vertical deflection rate signals. A source of control signals provides an indication of first and second operating conditions of the receiver. Switching means is coupled to the gating means and is responsive to the control signals for controlling the gating means for selectively deriving an output of the gating means from the first vertical deflection rate signals in response to the first receiver operating condition or from the second vertical deflection rate signal in response to the second receiver operating condition. The interface means comprises means coupled to the source of control signals and including an interface terminal for providing an indication at the terminal of the first or second receiver operating condition. The interface means also comprises means coupled to the switching means to the interface terminal for providing a control signal via the terminal to the switching means for selectively controlling the operation of the gating means.

Figure 2:
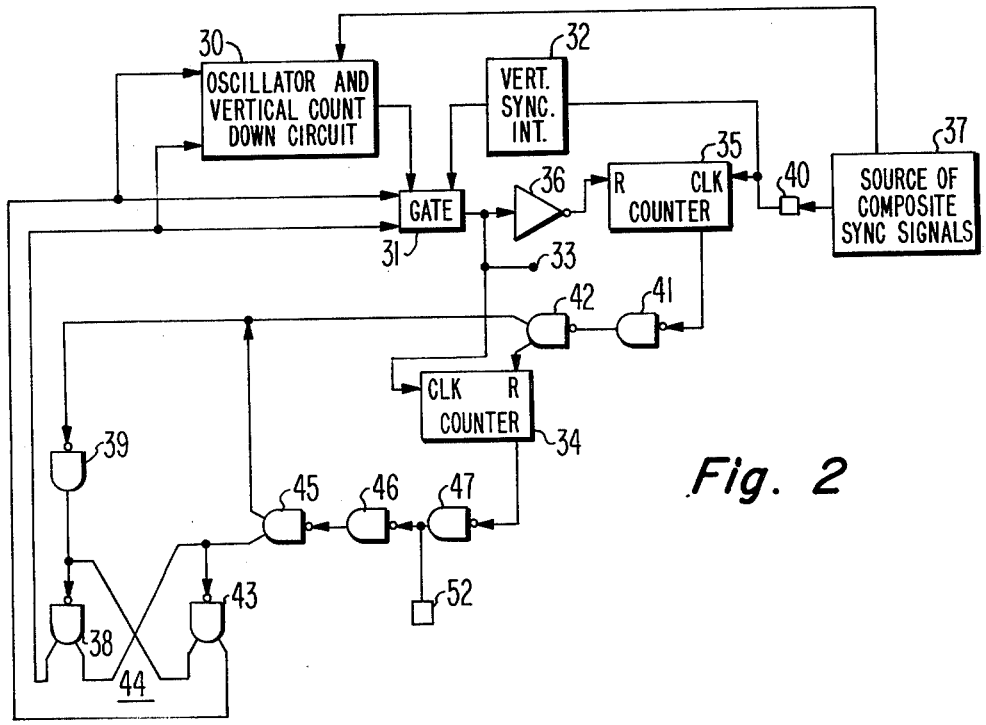

In the accompanying drawing, FIG. 1 illustrates in block and schematic diagram form, a portion of a prior art integrated circuit for use in a television receiver;

FIG. 2 illustrates in block and schematic diagram form a portion of an integrated circuit incorporating the present invention; and FIG. 3A–G are timing diagrams associated with the present invention.

Referring to FIG. 1, there is shown a portion of an integrated circuit for a television deflection circuit according to the prior art which, during normal receiver operation, provides a vertical deflection pulse which is derived from a multiple of the horizontal deflection rate via frequency divider or countdown circuitry. FIG. 1 illustrates an oscillator and vertical countdown circuit 9 which, during normal operation, provides a vertical deflection pulse to appropriate circuitry via a gate 10 and an output terminal 11. The vertical pulse is also processed by an inverter 12 and applied to an input of a counter 13. Counter 13 also receives an input from a source of composite synchronizing signals 14 via an integrated circuit interface terminal 15. This composite sync signal is also applied to oscillator and countdown circuit 9. The vertical deflection pulse from countdown circuit 9 is also applied to a counter 16.

Counter 13 is enabled by the vertical pulse from inverter 12 during which time it counts the serrations and equalizing pulses of the incoming vertical synchronizing signal. If counter 13 reaches a predetermined value while it is enabled indicating the reception of a standard broadcast signal, an output pulse is generated. This pulse is applied to reset counter 16 via gates 17 and 20. Counter 16 counts at the vertical rate via the input from gate 10 until reset from the counter 13 output. If counter 16 is not reset before a predetermined count is reached, indicating a lack of vertical sync serrations for a predetermined number of vertical fields, an output pulse is applied to gate 21. The presence or absence of counter 16 output pulse at the input of gate 21 controls the logic level of the output of gate 21. The gate 21 output is applied to flip-flop 22 which generates either a standard signal or a non-standard signal. This signal is applied to gate 10 which provides the vertical pulse at terminal 11 via the countdown mode from countdown circuit 9 upon reception of the standard control signal or provides a vertical pulse from an incoming vertical sync signal upon reception of the non-standard control signal. The vertical sync signal is derived by a vertical sync integrator 23 from the composite sync signal from source 14. The control signals from flip-flop 22 is also applied to oscillator and countdown circuit 9 to provide synchronization of oscillator 9 from incoming sync during the non-standard mode of operation. Flip-flop 22 is also controlled by the output from gate 25. Gate 25 is controlled via an interface terminal 27, which can be used to force the circuit into a non-standard mode for test or service purposes.

Figure 3:
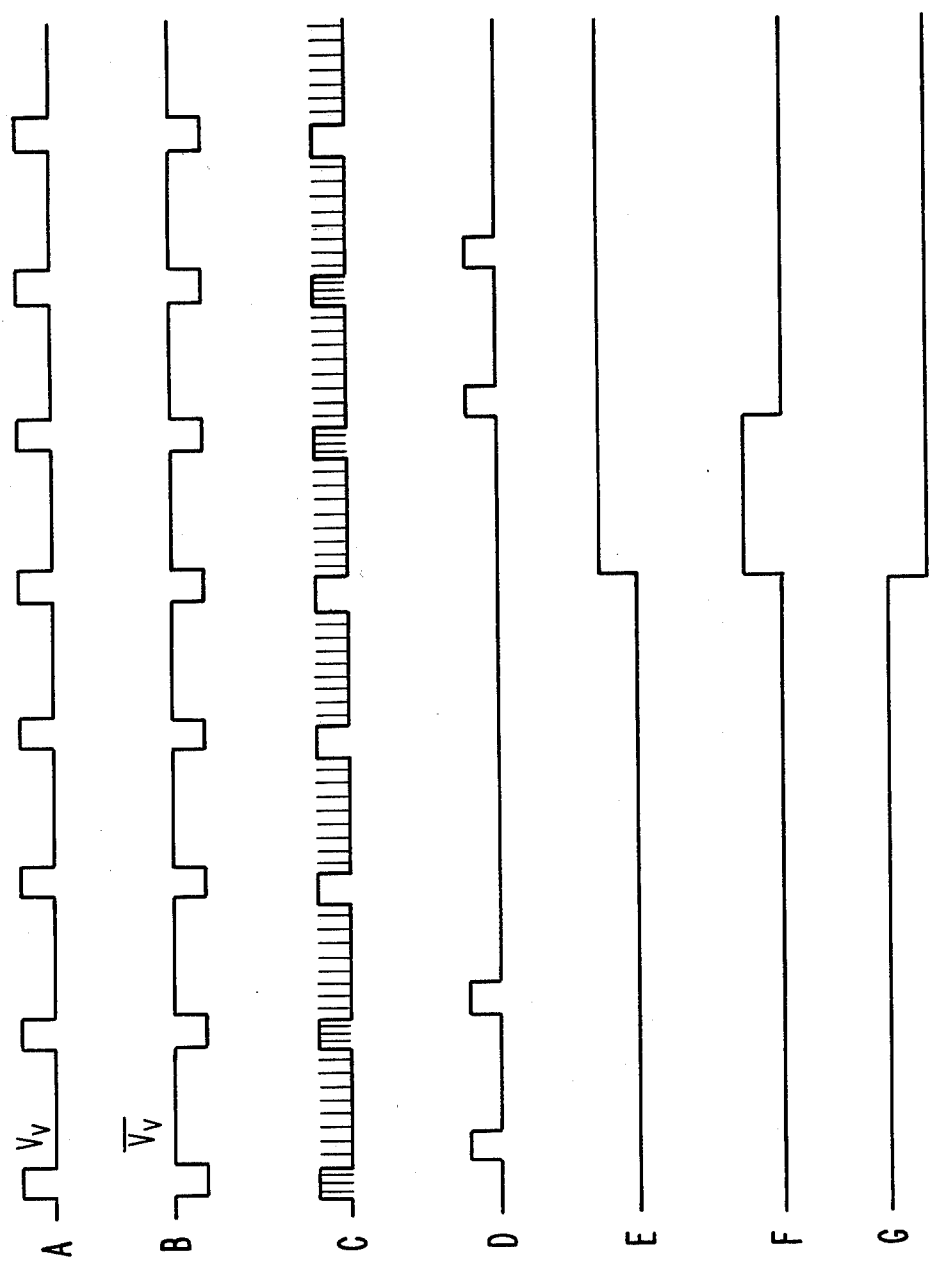

Although terminal 27 allows the manual selection of either the standard or non-standard mode, the identification of actual operating mode is not easily determined. FIG. 2 illustrates a circuit which provides operating mode identification as well as mode selection capability. p Referring to FIGS. 2 and 3, there is shown a portion of a vertical deflection countdown circuit in integrated circuit form. The circuit comprises an oscillator and vertical countdown circuit 30 which supplies a vertical pulse to one input of a gate circuit 31. Another input of gate circuit 31 is derived from the output of a vertical synchronizing signal integrator 32. The operation of gate 31 causes a vertical output pulse to be generated. This pulse is derived from either the output of countdown circuit 30 or vertical sync integrator 32. This vertical output pulse, shown in $V_v$ in FIG. 3A, is applied to appropriate receiver circuitry via an output terminal 33. The vertical output pulse is also applied to one input of a counter 34 and to an input of a counter 35 via an inverter 36. The inverted vertical signal is shown as $\overline{V_v}$ in FIG. 3B and is used to enable counter 35. The clock input of counter 35 is received from a source of composite synchronizing signals 37 via an integrated circuit interface terminal 40. The composite synchronizing signals shown in FIG. 3C are also applied to the input of vertical sync integrator 31 and to oscillator and countdown circuit 30, thereby permitting synchronization of the oscillator with incoming horizontal sync.

Counter 35, when enabled by the $\overline{V_v}$ signal, counts the vertical sync pulse serrations and equalizing pulses from the composite sync signal. Counter 35 produces an output pulse when a predetermined count value is reached. If the predetermined count value is not reached while counter 35 is enabled, no output is generated and the counter is reset to zero by the next $\overline{V_v}$ pulse.

During normal or standard mode of receiver operation the $V_v$ signal from gate 31 is derived from countdown circuit 30. The output signal from counter 35 is shown in FIG. 3D. When a sufficient number of serrations of the incoming vertical sync signal are counted during the enabling vertical pulse, an output is generated by counter 35. The output of counter 35 resets counter 34 via gates 41 and 42 and is applied to a gate 38 of a flip-flop 44 via a gate 39 in order to produce an output from flip-flop 44 as an indication of standard mode of operation. This signal, shown in FIG. 3E, is applied to gate 31. If an insufficient number of serrations or equalizing pulses are not counted by counter 35, an output is not generated and counter 34 is not reset. The number of counts needed to reset counter 35 is greater than the number of equalizing pulses which could occur during the $\overline{V_v}$ enabling interval. For a non-broadcast signal in which no serrations are present, counter 34 will not be reset. Serrations must be present in the vertical sync pulse in order that counter 34 is reset. Counter 34 is incremented at the vertical field rate by the $V_v$ signal from gate 31. A positive output from counter 34 is an indication that a non-standard signal has been received for a predetermined number of fields, as shown in FIG. 3F. The output of counter 34 is applied to one input of a gate 43 and to gate 38 of flip-flop 44 via series-connected gates 45, 46 and 47. The logical operation of gates 43, 45, 46 and 47 causes a positive output of counter 34 to produce an output from gate 43 of flip-flop 44 as shown in FIG. 3G. The output of flip-flop 44 is applied to gate 31 and to oscillator and countdown circuit 30. This non-standard condition causes the receiver to operate in a non-standard mode, in which the $V_v$ signal is derived from the incoming vertical sync signal from integrator 32 rather than from the countdown-derived signal and the oscillator and countdown circuit is synchronized from incoming vertical sync.

The output of flip-flop 44 may also be controlled by an input from an interface terminal 52. The input at terminal 52 is applied to flip-flop 44 via gates 46, 45 and 39. With the gate logic as shown in FIG. 2, grounding the input of terminal 52 places the receiver in the non-standard mode. A positive input at terminal 52 indicates the selection of standard operating mode.

The gate and logical switching levels of the gates shown in FIG. 2 are selected such that a non-standard indication from counter 34 or terminal 52 will place the receiver in the non-standard mode. A standard mode indication is needed by both of the above mentioned sources in order to place the receiver in the standard mode.

It has previously been described that terminal 52 may act as an input to select the desired mode of operation for servicing or testing purposes. As shown in FIG. 2, terminal 52 is located at the output of gate 47 equivalent to the output of counter 34. Terminal 52 thus indicates, as an output, the logical levels of counter 34 and any other detection circuitry which may be incorporated in the integrated circuit, thereby giving an indication of current mode of operation. Terminal 52, therefore, provides a dual function by providing a means of selecting an operating mode in addition to indicating the present operating mode.

What is claimed is:

1. In an integrated circuit, for use in a television receiver, incorporating oscillator means; countdown means coupled to said oscillator means for providing a first vertical deflection rate signal; a source of second vertical deflection rate signals; gating means selectively responsive to said first and second vertical deflection rate signals; a source of first and second control signals respectively providing an indication of first and second operating conditions of said receiver; and switching means coupled to said gating means and responsive to said first and second control signals for controlling said gating means for selectively deriving an output of said gating means from said first vertical deflection rate signals in response to said first control signal and from said second vertical deflection rate signals in response to said second control signal; an interface means comprising:

means coupled to said source of first and second control signals and including a dual function integrated circuit interface terminal for providing as a first function an output indication at said interface terminal of one of said first and second receiver operating conditions; and means coupled to said switching means and to said interface terminal for providing as a second function an input signal via said interface terminal to said switching means for selectively controlling the operation of said gating means in order to simulate said first and second receiver operating conditions.

2. The arrangement defined in claim 1, wherein said second vertical deflection rate signals comprise incoming vertical synchronizing pulses.

3. The arrangement defined in claim 2, wherein said first receiver operating condition represents a condition in which said first vertical deflection rate signals originate from a television broadcast source and said second receiver operating condition represents a condition in which said first vertical deflection rate signals do not originate from a television broadcast source.

* * * * *

UNITED STATES PATENT AND TRADEMARK OFFICE
CERTIFICATE OF CORRECTION

PATENT NO. : 4,387,397

DATED : June 7, 1983

INVENTOR(S) : WOLFGANG F. W. DIETZ

It is certified that error appears in the above-identified patent and that said Letters Patent is hereby corrected as shown below:

Column 2, line 63, delete "p" and insert a new paragraph beginning with "Referring".

Column 3, line 10, that portion reading "$V_v$" should read -- $\bar{V}_v$ --; line 18, that portion reading "$V_v$" should read -- $\bar{V}_v$ --; line 24, that portion reading "$V_v$" should read -- $\bar{V}_v$ --.

Signed and Sealed this

Twenty-third Day of August 1983

[SEAL]

Attest:

GERALD J. MOSSINGHOFF

Attesting Officer

Commissioner of Patents and Trademarks